(12) United States Patent
Stifter et al.

(10) Patent No.: US 11,266,936 B2
(45) Date of Patent: Mar. 8, 2022

(54) MELT-BLOWN DEPTH FILTER ELEMENT, METHOD AND MACHINE OF MAKING IT

(71) Applicant: GENERAL ELECTRIC COMPANY, Schenectady, NY (US)

(72) Inventors: Travis Gerald Stifter, Minnetonka, MN (US); Thomas Martin Aune, Minnetonka, MN (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 488 days.

(21) Appl. No.: 15/549,446

(22) PCT Filed: Apr. 1, 2016

(86) PCT No.: PCT/US2016/025758
§ 371 (c)(1),
(2) Date: Aug. 8, 2017

(87) PCT Pub. No.: WO2016/175982
PCT Pub. Date: Nov. 3, 2016

(65) Prior Publication Data
US 2018/0028954 A1 Feb. 1, 2018

Related U.S. Application Data

(60) Provisional application No. 62/153,641, filed on Apr. 28, 2015.

(51) Int. Cl.
*B01D 39/00* (2006.01)
*B01D 39/16* (2006.01)
*B01D 24/00* (2006.01)

(52) U.S. Cl.
CPC ....... *B01D 39/163* (2013.01); *B01D 39/1623* (2013.01); *B01D 2239/065* (2013.01); *B01D 2239/0622* (2013.01); *B01D 2239/10* (2013.01)

(58) Field of Classification Search
CPC .. B01D 24/001; B01D 24/004; B01D 24/008; B01D 24/007; B01D 27/00;
(Continued)

(56) References Cited

U.S. PATENT DOCUMENTS 3,073,735 A 1/1963 Till et al.
3,251,475 A 5/1966 Till et al.
(Continued)

FOREIGN PATENT DOCUMENTS

CA 2142857 A1 3/1994
CA 2810064 A1 3/2012
(Continued)

OTHER PUBLICATIONS

Canadian Patent Application No. 2370787, Office Action dated Apr. 6, 2009.
(Continued)

*Primary Examiner* — Allison G Fitzsimmons

(57) ABSTRACT

A tubular depth filter element has one or more concentric zones. Each zone includes layers of a melt blown filament. An additional filament oscillates through the depth of the element, traversing through part of the depth of the filament with each oscillation but traversing through substantially all of the depth of the element over multiple oscillations. The traversing filament is preferably biased towards the outside of the element. The depth filter element may be made by spraying filaments onto a rotating mandrel. The filaments of the concentric zones are sprayed from fixed nozzles spaced apart along the length of the mandrel. The traversing filament is sprayed from a nozzle assembly that moves laterally or has compound motion relative to the mandrel. For example, the nozzle assembly may oscillate relative to the mandrel while an air attenuator of the nozzle assembly oscillates relative to the remainder of the nozzle assembly.

8 Claims, 4 Drawing Sheets

(58) Field of Classification Search
CPC ...... B01D 27/005; B01D 27/02; B01D 39/00;
B01D 39/02; B01D 39/04; B01D 39/06;
B01D 39/14; B01D 39/16; B01D
39/1607; B01D 39/20; B01D 39/1623;
B01D 23/00; B01D 23/005; B01D 23/10;
B01D 23/02; B01D 2101/00; B01D
2101/005; B01D 2201/00; B01D 2201/02;
B01D 2275/00; B01D 2275/10; B01D
2275/201; B01D 2275/204; B29C 48/05;
B29C 48/345; B29C 48/30; B29K
2023/12; D04H 3/07; Y10T 428/24;
Y10T 428/2492; Y10T 428/249921
USPC ..... 210/505, 348, 500.1, 503, 508; 428/212,
428/98, 101, 105, 113, 218, 219, 220,
428/221, 222
See application file for complete search history.

(56) References Cited

U.S. PATENT DOCUMENTS

| | | |
|---|---|---|
| 3,261,473 A | 7/1966 | Riede |
| 3,347,391 A | 10/1967 | Steensen |
| 3,353,682 A | 11/1967 | Pall et al. |
| 3,595,245 A | 7/1971 | Buntin et al. |
| 3,801,400 A | 4/1974 | Vogt et al. |
| 3,825,379 A | 7/1974 | Lohkamp et al. |
| 3,825,380 A | 7/1974 | Harding et al. |
| 3,849,241 A | 11/1974 | Butin et al. |
| 3,904,798 A | 9/1975 | Vogt et al. |
| 3,933,557 A | 1/1976 | Pall |
| 4,021,281 A | 5/1977 | Pall |
| 4,116,738 A | 9/1978 | Pall |
| 4,173,443 A | 11/1979 | Lin |
| 4,225,642 A | 9/1980 | Hirakawa |
| 4,240,864 A | 12/1980 | Lin |
| 4,594,202 A | 6/1986 | Pall et al. |
| 4,676,807 A | 6/1987 | Miller et al. |
| 4,714,647 A | 12/1987 | Shipp, Jr. et al. |
| 4,726,901 A | 2/1988 | Pall et al. |
| 4,759,782 A | 7/1988 | Miller et al. |
| 4,861,633 A | 8/1989 | Abe |
| 5,279,731 A | 1/1994 | Cook et al. |
| 5,283,106 A | 2/1994 | Seiler et al. |
| 5,288,402 A | 2/1994 | Yoshida |
| 5,340,479 A | 8/1994 | Szczepanski et al. |
| 5,360,545 A | 11/1994 | Pall et al. |
| 5,366,576 A | 11/1994 | Clack |
| 5,409,642 A | 4/1995 | Allen et al. |
| 5,523,033 A | 6/1996 | Shambaugh |
| 5,591,335 A | 1/1997 | Barboza et al. |
| 5,681,469 A | 10/1997 | Barboza et al. |
| 5,980,759 A | 11/1999 | Proulx et al. |
| 6,358,417 B1 | 3/2002 | Aune et al. |
| 6,419,839 B1 | 7/2002 | Cox et al. |
| 6,580,813 B1 | 6/2003 | Hermanns et al. |
| 6,743,273 B2 | 6/2004 | Chung et al. |
| 6,800,117 B2 | 10/2004 | Barris et al. |
| 6,916,395 B2 | 7/2005 | Aune et al. |
| 6,938,781 B2 | 9/2005 | Aune et al. |
| 6,986,427 B2 | 1/2006 | Aune et al. |
| 7,008,465 B2 | 3/2006 | Graham et al. |
| 7,390,343 B2 | 6/2008 | Tepper et al. |
| 7,645,312 B2 | 1/2010 | Hamlin et al. |
| 2007/0062887 A1 | 3/2007 | Schwandt et al. |
| 2007/0102101 A1 | 5/2007 | Spearin et al. |
| 2007/0251876 A1 | 11/2007 | Krogue et al. |
| 2008/0128364 A1 | 6/2008 | Cloud et al. |
| 2008/0245719 A1 | 10/2008 | Beard et al. |
| 2008/0302074 A1 | 12/2008 | Gebert et al. |
| 2008/0314011 A1 | 12/2008 | Smithies et al. |
| 2009/0266048 A1 | 10/2009 | Schwarz |
| 2011/0210059 A1 | 9/2011 | Green et al. |
| 2013/0306562 A1 | 11/2013 | Stifter et al. |
| 2015/0122726 A1 | 5/2015 | Stifter et al. |

FOREIGN PATENT DOCUMENTS

| | | |
|---|---|---|
| CN | 1188422 A | 7/1998 |
| CN | 101039734 A | 9/2007 |
| CN | 101432056 A | 5/2009 |
| CN | 101754792 A | 6/2010 |
| CN | 102002820 A | 4/2011 |
| CN | 102858439 A | 1/2013 |
| CN | 203303753 U | 11/2013 |
| CN | 104321121 A | 1/2015 |
| DE | 202004017134 U1 | 7/2005 |
| EP | 0475708 A1 | 3/1992 |
| EP | 0880988 A1 | 12/1998 |
| FR | 1400619 A | 5/1965 |
| JP | S5096110 A | 7/1975 |
| JP | S5371369 A | 6/1978 |
| JP | S60216818 A | 10/1985 |
| JP | S6257626 A | 3/1987 |
| JP | S63287517 A | 11/1988 |
| JP | H01297113 A | 11/1989 |
| JP | H04244206 A | 9/1992 |
| JP | 2000053326 A | 2/2000 |
| JP | 2000271417 A | 10/2000 |
| JP | 2006527072 A | 11/2006 |
| JP | 2008057053 A | 3/2008 |
| JP | 2008525692 A | 7/2008 |
| JP | 2010179262 A | 8/2010 |
| WO | 9813123 A1 | 4/1998 |
| WO | 0062890 A1 | 10/2000 |
| WO | 2009088647 A1 | 7/2009 |
| WO | 2012034028 A2 | 3/2012 |

OTHER PUBLICATIONS

Canadian Patent Application No. 2370787, Office Action dated Jan. 18, 2010.
Canadian Patent Application No. 2370787, Office Action dated Oct. 22, 2010.
Chinese Patent Application No. 201680019986.4, First Office Action dated Jul. 15, 2019—English Translation available.
Chinese Patent Application No. 201180043354.9, Office Action dated Sep. 3, 2014.
Chinese Patent Application No. 201480061130.4, Office Action dated Nov. 15, 2016.
European Patent Application No. 02780520.9, European Search Report dated Nov. 25, 2004.
European Patent Application No. 02780520.9, Office Action dated Jun. 15, 2010.
Frank et al., "Electropositive Filtration Technology in Automobile Manufacturing Applications," WQA Aquatech, Mar. 2008, 8 Pages.
Indian Patent Application No. 201647018621, First Examination Report dated Jul. 25, 2019.
International Patent Application No. PCT/US2000/10751, International Search Report dated Jul. 20, 2000.
International Patent Application No. PCT/US2002/33924, International Search Report dated Feb. 11, 2003.
International Patent Application No. PCT/US2011/051012, International Search Report and Written Opinion dated Oct. 2, 2013.
International Patent Application No. PCT/US2014/064125, International Preliminary Reporton Patentability and Written Opinion dated May 19, 2016.
International Patent Application No. PCT/US2014/064125, International Search Report and Written Opinion dated Feb. 24, 2015.
International Patent Application No. PCT/US2016/025758, International Search Report and Written Opinion dated Jun. 17, 2016.
Japanese Patent Application No. 2017-550937, Office Action dated Jan. 9, 2020—English Translation available.
Japanese Patent Application No. 2000612024, Office Action dated Feb. 22, 2010.
Japanese Patent Application No. 2013528331, Notice of Allowance dated Nov. 1, 2016.
Japanese Patent Application No. 2013528331, Office Action dated Aug. 25, 2015.

(56) References Cited

OTHER PUBLICATIONS

Japanese Patent Application No. 2016-526779, Office Action dated Jul. 4, 2017.
Japanese Patent Application No. 2016-526779, Office Action dated Oct. 17, 2017.
Komlenic, "Benefits of Alumina Nanofiber Technology for Drinking Water Filtration," AFS Spring Conference,May 2009, 34 Pages.
Kremen et al., "Silt Density Indices (SDI), Percent Plugging Factor (%PF): their Relation to Actual Foulant Deposition," Desalination, Sep. 1998, vol. 119 (1-3), pp. 259-262.
U.S. Appl. No. 14/533,862, Notice of Allowance dated Oct. 3, 2018.
U.S. Appl. No. 09/550,814, Final Office Action dated Apr. 21, 2004.
U.S. Appl. No. 09/550,814, Non-Final Office Action dated Dec. 11, 2003.
U.S. Appl. No. 10/056,715, Final Office Action dated Mar. 12, 2004.
U.S. Appl. No. 10/056,715, Non-Final Office Action dated Apr. 9, 2003.
U.S. Appl. No. 10/056,715, Non-Final Office Action dated Jan. 18, 2005.
U.S. Appl. No. 10/056,715, Non-Final Office Action dated Sep. 12, 2003.
U.S. Appl. No. 10/278,247, Non-Final Office Action dated Jun. 21, 2004.
U.S. Appl. No. 10/278,247, Notice of Allowance dated Sep. 8, 2005.
U.S. Appl. No. 10/278,322, Notice of Allowance dated Apr. 27, 2005.
U.S. Appl. No. 10/279,043, Non-Final Office Action dated Dec. 1, 2004.
U.S. Appl. No. 10/279,043, Non-Final Office Action dated Jul. 2, 2004.
U.S. Appl. No. 13/821,742, Final Office Action dated Mar. 16, 2017.
U.S. Appl. No. 13/821,742, Non-Final Office Action dated Jul. 21, 2017.
U.S. Appl. No. 13/821,742, Non-Final Office Action dated Sep. 8, 2016.
U.S. Appl. No. 14/533,862, Final Office Action dated Aug. 21, 2017.
U.S. Appl. No. 14/533,862, Non-Final Office Action dated Jan. 11, 2018.
U.S. Appl. No. 14/533,862, Non-Final Office Action dated May 5, 2017.
International Patent Application No. PCT/US2016/025758, International Preliminary Reporton Patentability dated Nov. 9, 2017.
Chinese Patent Application No. 201680019986.4, Office Action dated Mar. 2, 2020.
Gulf Patent Application No. GC2016/31230, Office Action dated Feb. 28, 2020.
Canadian Patent Application No. 2928705, Office Action dated Dec. 8, 2020.
Indian Patent Application No. 201737028504, First Examination Report dated Dec. 17, 2020.
European Patent Application No. 16717040.6, Communication pursuant to Article 94(3) EPC dated Feb. 19, 2021.
Japanese Patent Application No. 2017-550937, Office Action dated Jun. 2, 2020.
Canadian Patent Application No. 2,976,014, Office Action dated Jan. 20, 2022.

MELT-BLOWN DEPTH FILTER ELEMENT, METHOD AND MACHINE OF MAKING IT

CROSS-REFERENCE TO RELATED APPLICATIONS

This application is a National Stage Entry of International Application No. PCT/US2016/025758, filed Apr. 1, 2016, which is a non-provisional application of U.S. Application Ser. No. 62/153,641, filed Apr. 28, 2015. U.S. Application Ser. No. 62/153,641 is incorporated by reference.

FIELD

This specification relates to depth filter elements, to melt blown media and to methods of making them.

BACKGROUND OF THE INVENTION

The following background discussion is not an admission that anything discussed below is common general knowledge or citable prior art.

A depth filter retains particles throughout the depth of a filtration media. Various media can be used to construct a depth filter, one of them being a non-woven media of melt blown or spun bond filaments. A depth filter may have multiple layers (or zones), with the layer having the largest pore size usually forming an upstream layer and the layer having the smallest pore size usually forming a downstream layer. This is in contrast to surface filters, alternatively called screen filters, which retain particles primarily by size exclusion on or near an upstream separation layer rather than throughout the depth of the filtration media. A surface filter may provide some depth filtration for particles below its rated absolute particle size, but the amount of depth filtration is limited by the surface filter's lack of thickness and the desire to make any layers behind the upstream separation layer as permeable as possible. A depth filter may be distinguished from a surface filter by way of the depth filter's substantial thickness, which is typically at least 5 mm and more often at least 10 mm. A depth filter is also typically provided in a configuration that provides a smooth inner and outer peripheral surface to maximize its volume whereas a surface filter is typically folded or pleated so as to maximize its surface area.

A cartridge filter installation has one or more removable or replaceable cartridges placed in a housing. A typical cartridge has a filter element with end caps or other fixtures adapted to connect the cartridge to the housing. Some cartridges may be cleaned, but they are typically discarded at the end of their useful life. A depth filter element may be rated according to its dirt holding capacity (DHC), which is measured by weight of solid particles that the filter can hold before plugging. The useful life of an element is measured as the time the element can be operated under specified conditions before reaching a specified maximum pressure drop across the depth filter cartridge. The useful life of an element may be limited by its DHC or by its mechanical ability to withstand the applied pressure as it becomes loaded with particles. Other rating criteria include the efficiency of the element in removing particles of a specified size and the clean water pressure drop of the element. For example, a removal efficiency rating may be specified as 90% removal of particles down to a specified micron size or as "absolute" (meaning 99%) removal of particles down to a specified micron size.

U.S. Pat. No. 6,986,427, issued on Jan. 17, 2006 to Aune et al., describes a melt blown non-woven media useful for a depth filter element. The media is made by directing a plurality of melt blown filaments at the side of a conical end of a tubular structure. The tubular structure rotates on a spinning mandrel. The tubular structure grows in length as material is added to its conical end while the tubular structure is drawn out of the filament spray area along the length of the mandrel. Different filaments are directed at different portions of the cone, and the filaments may vary in one or more characteristics along the length of the cone. This produces concentric annular zones in the tubular element with a corresponding variation in the one or more characteristics. One or more other melt blown filaments may be applied across the length of the cone to add filaments that extend through the depth of the element, crossing multiple zones, to strengthen the media.

U.S. Pat. No. 6,938,781, which shares a common priority application with U.S. Pat. No. 6,986,427, describes a non-woven depth filter element that includes a cylindrical mass of essentially continuous melt-blown polymer filaments and an essentially continuous traversing melt blown polymer filament extending through the mass. The cylindrical mass has a depth dimension, a longitudinal dimension, and a circumferential dimension. The filaments of the cylindrical mass are generally oriented in the longitudinal and circumferential dimensions and form a plurality of concentric zones. The traversing filament extends in the longitudinal dimension through a substantial portion of a length of the cylindrical mass while extending around the cylindrical mass in the circumferential dimension and extending radially in the depth dimension through substantially an entire thickness of two or more zones of the cylindrical mass.

Polypropylene depth filter elements made according to the patents described above are sold by GE Water and Process Technologies in association with the Z.PLEX trade mark. These elements have inside diameters of about 1 inch (25 mm) and outside diameters of about 2 inches (51 mm) to 2.75 inches (70 mm). They are used in a number of water filtration applications.

International Application No. PCT/US2014/064125, filed by General Electric Company on Nov. 5, 2014, describes another depth filter element. One of the filaments in this element is formed in a spray pattern that is angled towards an adjacent spray pattern so as to overlap with at least 50% of the adjacent spray pattern. These filters may be made in a larger format, for example with inside diameters of about 3 inches (76 mm) and outside diameters of about 6.5 inches (165 mm).

INTRODUCTION TO THE INVENTION

The following introduction is intended to introduce the reader to the detailed description to follow and not to limit or define the claimed invention. A claimed invention may be a sub-combination of elements or steps described below, or include an element or step described in other parts of this specification.

This specification describes a depth filter element having one or more, preferably three or more, concentric zones. Each zone includes an essentially continuous melt blown filament. An additional filament reciprocates through the depth of the element. The additional filament defines a helicoid of varying diameter. The mass of the traversing filament is preferably biased towards one or more outer concentric zones.

This specification also describes a method of making a depth filter element. Melt blown filaments are sprayed onto a rotating mandrel. One set of filaments is sprayed from one or more nozzles that are fixed in place relative to the mandrel. Another filament is sprayed from a nozzle assembly that moves laterally or has compound motion relative to the mandrel. In an example of compound motion, the nozzle assembly oscillates relative to the mandrel while part of the nozzle assembly oscillates relative to the remainder of the nozzle assembly. The frequency of oscillation relative to the mandrel is preferably less than the frequency of oscillation relative to the nozzle assembly. Lateral movement of the nozzle assembly relative to the mandrel produces a spray pattern than traverses at least part of the depth of the element. Compound motion produces a spray pattern that traverses part of the depth of the element in a single oscillation but traverses more, preferably all, of the depth of the element over multiple oscillations.

In an example, a traversing filament is produced from a nozzle assembly that translates back and forth relative to a mandrel. An attenuator of the nozzle assembly oscillates relative to the remainder of the nozzle assembly. The nozzle assembly preferably dwells at an end of its translation.

DETAILED DESCRIPTION

Figure 1:
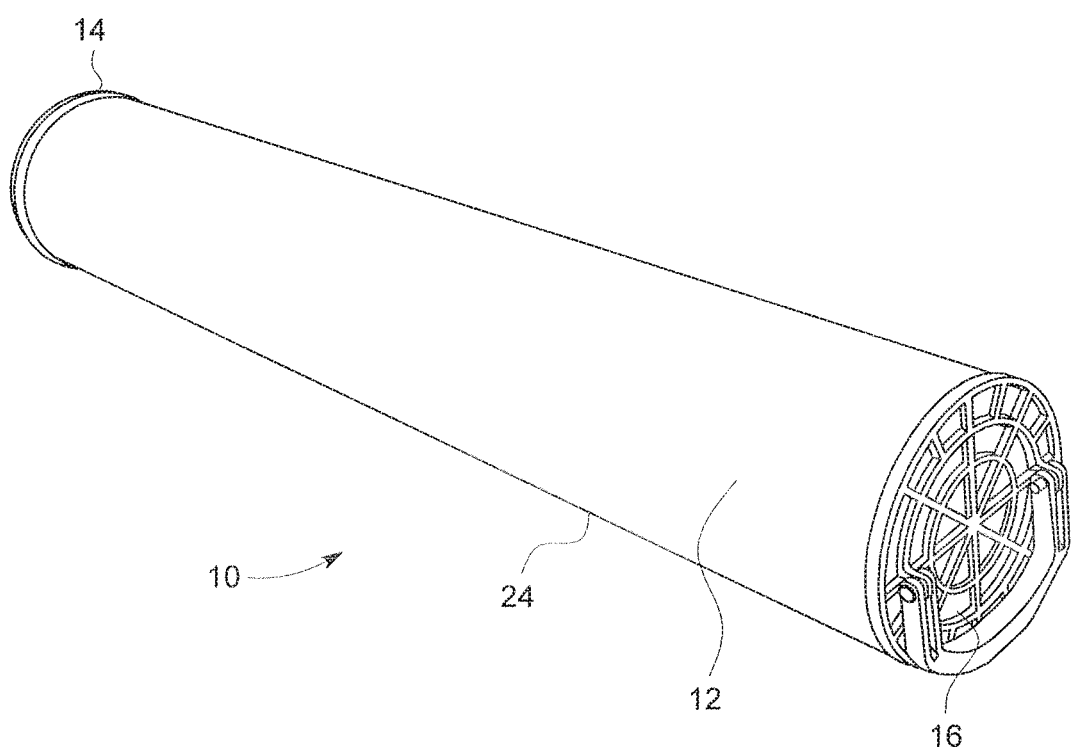
FIG. 1 is a photograph of a depth filter cartridge taken from its right side.

Approximating language, as used herein throughout the specification and claims, may be applied to modify any quantity that could vary without resulting in a change in the basic function to which it is related. Accordingly, a value modified by a term or terms such as "about" is not limited to the precise value specified. In some instances, the approximating language may correspond to the precision of an instrument for measuring the value. Range limitations may be combined and/or interchanged, and such ranges, and all sub-ranges, are included herein unless context or language indicates otherwise. Other than in the operating examples or where otherwise indicated, all numbers or expressions referring to quantities of materials, process conditions and the like, used in the specification and the claims, are to be understood as modified in all instances by the term "about".

"Optional" or "preferable" and similar terms mean that the subsequently described event or circumstance may or may not occur, or that the subsequently identified material may or may not be present, and that the description includes instances where the event or circumstance occurs or where the material is present, and instances where the event or circumstance does not occur or the material is not present. The term "may" is used to indicate conditions that might or might not be present.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements, but may include other elements not expressly listed or inherent to such process, method article or apparatus. The singular forms "a," "an" and "the" include plural referents unless the context clearly dictates otherwise.

A depth filter element described herein provides a useful alternative to existing filter elements. The depth filter element may have, for example, an outside diameter of at least 2.0 inches (25 mm), optionally at least 4.5 inches (114 mm). An exemplary filter element is made with a melt blown traversing filament sprayed onto a filter element as it is being formed on a rotating mandrel. The traversing filament is produced with an air-attenuated nozzle that disperses the filament within a cone shaped spray area. The attenuator pivots such that the cone shaped spray area oscillates across part of the length the filter being formed. The nozzle also reciprocates from side to side relative to the length of the mandrel to further expand the distance covered by the spray area. Relative to a polymer nozzle and attenuator adapted to oscillate through a wider arc to cover a similar distance, the reciprocating nozzle is believed to place more traversing filament mass towards the outside of the filter element. This effect can be enhanced by reciprocating the nozzle such that it spends a disproportionate amount of time at or near the side of its travel corresponding to the outside of the element.

Without intending to be limited by theory, the inventors believe that an oscillating but laterally fixed traversing filament spray pattern tends to provide sub-optimal traversing filament mass in the outer zones of a filter. This becomes more noticeable in filter elements with large diameters and thick walls. Moving the traversing filament nozzle laterally relative to the mandrel while forming the filter allows for relatively more of the mass of the traversing filament to be located in an outer zone or zones. This is believed to stiffen the structure of the outer zone or zones of the filter and help prevent open voids from collapsing in these zones. A low frequency lateral oscillation of the nozzle relative to the mandrel itself also appears to have beneficial effects on the lifetime and dirt holding capacity of the element. This oscillation could also be biased towards the inner diameter zones in the instance of an inside to outside flow condition.

Figure 2:
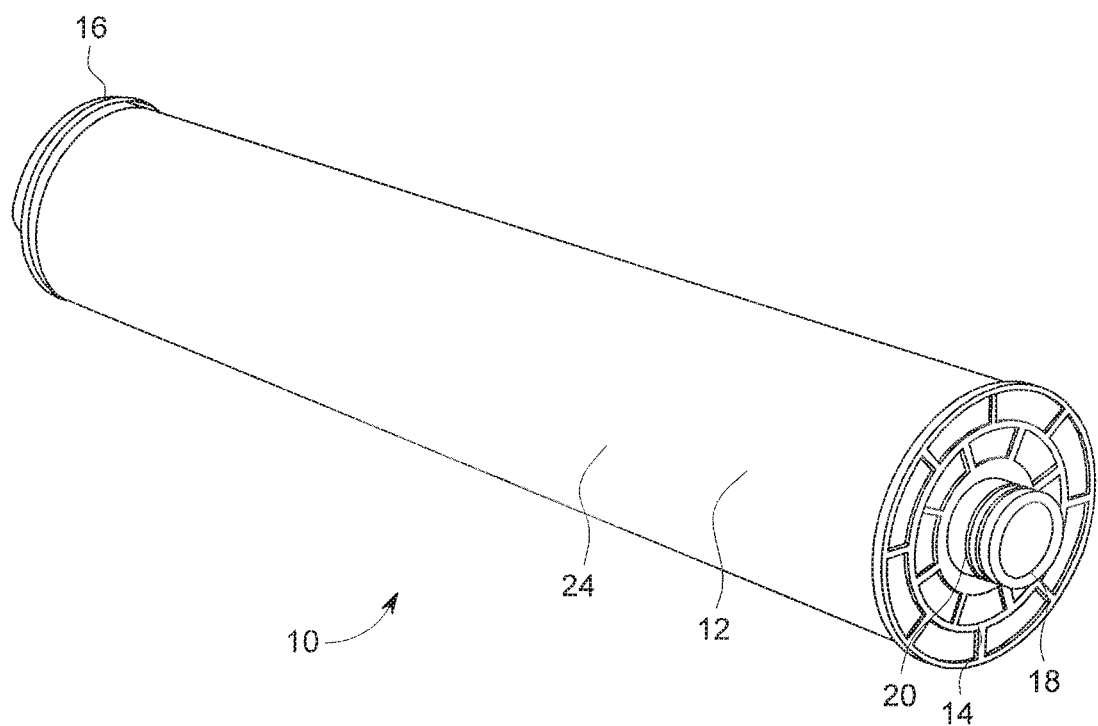
FIG. 2 is a photograph of the depth filter cartridge of FIG. 1 taken from its left side.

Referring to FIGS. 1 and 2, a depth filter cartridge 10 has a tubular depth filter element 12, a left side end cap 14 and a right side end cap 16. The words "left side" and "right side" are arbitrary and will be used in this description merely to provide a means to describe the cartridge 10 as it is oriented in the figures. The cartridge 10, or a part of it, may also be described as having length (measured in a longitudinal dimension parallel to a line between the left and rights sides of the cartridge), circumference (measured in a circumferential dimension along a circle perpendicular to the longitudinal dimension), or depth (measured in a radial dimension perpendicular to the circumferential dimension).

The end caps 14, 16 may be made of a thermoplastic material and are preferably thermally bonded to each end of the depth filter element 12 to form a seal with the ends of the depth filter element 12. Alternatively, the end caps 14, 16 may be bonded to the depth filter element 12 by an adhesive or by other means known in the art. The end caps 14, 16 fluidly separate the outside of the depth filter element 12 from the hollow center of the depth filter element 12. Preferably, a porous core tube (not visible) extends through the hollow center of the depth filter element 12 and is attached and sealed to the end caps 14, 16.

The depth filter cartridge 10 is typically used after inserting it into a housing or shell, not shown. The housing may hold one, or more than one, cartridge 10. In an outside-in filtration mode, feed water to be filtered flows through an inlet into a plenum defined by the inside of the housing and the outside of the cartridge 10. The feed water then flows through the depth filter element 12 and filtered water collects in the hollow center of the depth filter element 12 or the core tube. One or both of the end caps 14, 16 has an opening for the filtered water connected to an outlet of the housing. In the cartridge 10 shown, the left side end cap 14 includes an adapter 18 and a seal 20, which plug into an outlet of the housing. The seal 20 is an O-ring located in a groove in the adapter 18. Alternatively, a seal 20 may be formed by potting an elastomeric material in a groove to provide a planar annular gasket around an adapter 18 that is in the form of a simple hole, or by other means known in the art. Alternatively, the depth filter cartridge 10 may be used in an inside-out filtration mode by reversing the flows of water described above. In this case, variations in the structure of the element 12 between its inner and outer surfaces are preferably inverted.

Figure 3:
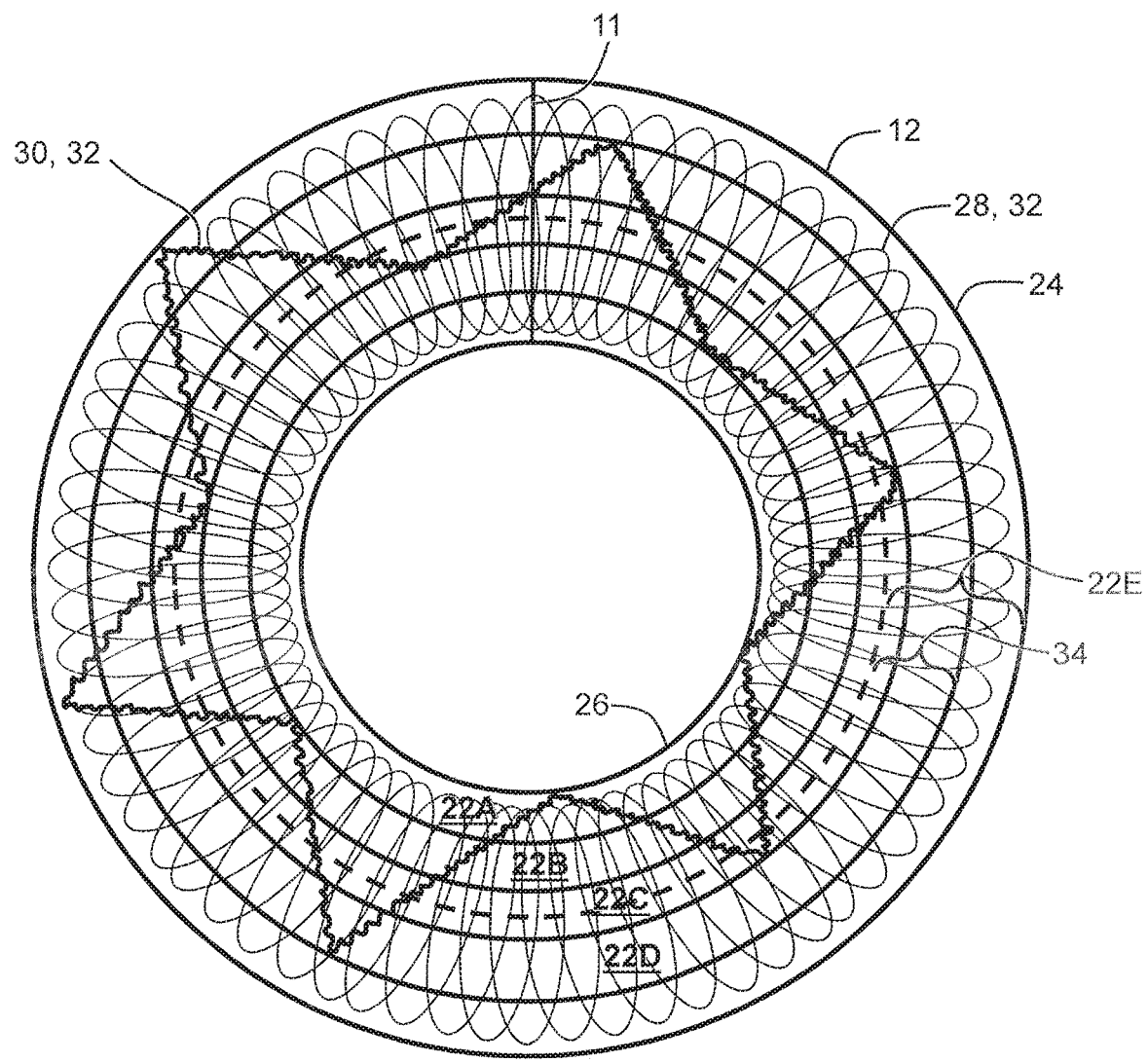
FIG. 3 is a schematic end view of the depth filter cartridge of FIG. 1 as it is being formed.

Referring to FIG. 3, the depth filter element 12 comprises a plurality of media layers or zones 22 through its depth. Preferably, the zones decrease in retention size (particle size removed at a given efficiency) from the outside surface 24 to the inside surface 26 of the depth filter element 12. Thus, large particles will be retained near the outside surface 24 and progressively smaller particles will be retained as the feed passes inwards through the depth filter element 12. Although the zones 22 are illustrated with a sharp line between them for ease of illustration, in practice there may be a more gradual transition, or a transitional area, between zones 22. Although 5 zones 22 are preferred, as shown, there could be more or less zones. In the depth filter element 12 of FIGS. 1 and 2, each of its five zones 22 has a different filament diameter and retention size with both the filament diameter and retention size decreasing towards the inside surface 26. Optionally two or more zones 22 may have the same filament diameter or retention size, but preferably while still providing an overall decrease in retention size towards the inside surface 26 for the depth filter element 12 as a whole.

In the example of FIGS. 1 and 2, the depth filter element 12 has an outside diameter of about 6.5 inches and an inside diameter of about 3 inches. The length of the cartridge 10 is about 38 inches, which corresponds with a nominal length of 40 inches. The adapter 18 is a standard type 226 fitting, although other suitable fittings may be used. The dimensions of the cartridge 10 may also be varied. For example, the outside diameter may be larger or smaller, preferably in the range of 3 inches to 9 inches, or 4.5 inches to 7 inches. The length may also be larger or smaller, for example a nominal 60-inch cartridge may be made. Optionally, a surface filter may be provided inside of the depth filter element 12 in the manner described in International Publication Number WO 2012/034028, which is incorporated by reference. In this case, the surface filter may, for example, rest on a core tube having an outside diameter of between about 1.1 inches and 3 inches and extend to an outside diameter of the inner surface filter of between about 2 inches and 4.5 inches.

The cartridge 10 of FIGS. 1 and 2 is made with a polypropylene (PP) depth filter element 12 and PP end caps 14, 16 thermally welded to the depth filter element 12. In other options, the end caps 14, 16 could be made of another polymer, such as ABS, and they could be attached to the element 12 with an adhesive. Other materials useful for forming the depth filter element 12 include, for example, other polyolefins such as polyethylene, cellulose, polyamides, polyesters, and mineral fibers. Multiple materials may be used in a single cartridge 10.

The depth filter element 12 may be made of melt blown media wherein each zone 22 is a mass formed of one or more essentially continuous polymer filaments. As will be described below in relation to FIG. 4, each zone 22 is made of polymer supplied from a melt blown filament delivery system. Subject to the possibility of random breaks, each zone 22 is made from a single essentially continuous filament. The filaments making up the zones 22 extend primarily in the longitudinal and circumferential directions. Preferably, the depth filter element 12 also comprises one or more multiple zone filaments 32. The multiple zone filaments 32 are essentially continuous polymer filaments extending in the depth dimension between two or more zones 22, preferably between all of the zones 22. In FIG. 3 (and in the cartridge of FIGS. 1 and 2) the multiple zone filaments 32 include static filaments 28 and Z-filaments 30, also called traversing filaments, as described in U.S. Pat. Nos. 6,938,781 and 6,986,427.

FIG. 3 is an end view of an element 12 as it is being formed. As will be described further in relation to FIG. 4, filaments making up the zones 22 are built up into a mass layer upon layer by being sprayed from longitudinally spaced positions against a rotating conical end of the depth filter element 12 being formed. As the element 12 is rotated, new layers of filaments are pressed against the existing layers at press roll contact line 11. The end of element 12 is therefore generally conical, but it is actually a helicoid or screw with radial lines in its plane at a shallow angle relative to a longitudinal axis of the element 12, rather than at a right angle as in a typical screw. The multiple zone filaments 32 are similarly sprayed against the rotating end of the depth filter element 12 being formed, but these filaments 32 are sprayed in a pattern that extends longitudinally across multiple zones 22. The multiple zone filaments 32 are thereby placed between successive turns of the helicoids that make up the zones 22. A multiple zone filament 32 is not primarily responsible for forming any particular zone 22. The multiple zone filaments 32 collectively provide less than 50% of the filament mass in any zone.

The multiple zone filaments 32, among other things, improve fiber to fiber bonding and provide an interlocking element to the mechanical structure of the other filaments. Without intending to be limited by theory, the multiple zone filaments 32 may function to loft the layers of filament within the zones 22 to thereby increase the void volume of the element 12. The multiple zone filaments 32 are placed between layers of filament within the zones 22 and may also thereby help prevent the zones 22 from collapsing.

The mass of the static filament or filaments 28 is highest, at least on a per unit volume basis but preferably also on an absolute basis, in the innermost zone or zones 22. The diameter of the static filament or filaments 28 may be about the same as or larger than the diameter of the filaments used in the innermost zone 22. A static filament 28 strengthens the inner zones 22, which would otherwise be weak in compression given the small filament diameter used in the inner zones 22 to provide retention of small particles.

The Z-filament or filaments 30 are sprayed in a pattern that traverses back and forth across a helix on the helicoidal end of the depth filter element 12 being formed. The diameter of this helix oscillates. The frequency of this oscillation is highly exaggerated in FIG. 3 for the purposes of illustration. The Z-filament 30 is produced from a delivery system with a compound movement, for example a relatively high frequency oscillation superimposed on a relatively low frequency oscillation. The high frequency oscillation is preferably at least 3 times the frequency of rotation of the mandrel. In the example shown, the high frequency oscillation is 6 times the frequency of rotation of the mandrel and so 6 large apexes are produced. The smaller and even more frequent apexes are a figurative illustration only of the somewhat random pattern produced by air attenuation at the end of the spray nozzle. Referring back to the 6 large apexes, the low frequency oscillations causes the large apexes to move radially outwards and inwards which, considering that FIG. 3 is an end view of a cone or helicoid, means that the large apexes are also moving longitudinally from one apex to another. As indicated in FIG. 3, the magnitude of the low frequency oscillation may be less than the magnitude of the high frequency oscillation. However, the apparent frequency of the low frequency oscillation is highly exaggerated in FIG. 3 in order to make the resulting movement more visible. Preferably, the low frequency oscillation is one tenth or less of the frequency of rotation of the mandrel. In other words, the movement of the Z-filament 30 oscillations from near the outside surface 24, towards the inside surface 26, and back towards the outside surface 24 may occur over 10 or more layers of the element 12 rather than just one as shown in FIG. 3. The low frequency oscillation may also be irregular, in particular it may be biased towards the outside of the depth filter element 12.

The Z-filament 30 provides a filament mass that is concentrated (i.e. it has areas of higher and lower density) in the circumferential direction whereas a static filament 28 and the filaments making up the zones 22 have homogenous density in the circumferential dimension. A Z-filament 30 thereby links multiple zones 22, preferably all of the zones 22, together with compression resistant regions without greatly increasing the density of the depth filter element 12 as a whole. The mass of the Z-filament or filaments 30 is preferably between 2 and 20% of the mass of the depth filter element 12. Optionally, the per unit volume density of Z-filament 30 may be higher in inner zones 22 to further strength these zones. For example, Z-filament 30 may make up about 25% of the filament mass in the innermost zone 22A and about 5% of the filament mass in the outermost zone 22E. However, assuming equal zone thickness, the outermost zone 22E has more volume than the innermost zone 22A. To prevent outer zone collapse, particular in elements 12 with an outside diameter of 4.5 inches (114 mm) or more used with an outside-in flow path, the mass of Z-filament 30 in the outermost zone 22E is preferably equal to or higher than the mass of Z-filament 30 in the innermost zone 22A.

As shown in FIG. 3, the depth filter element 12 shown has five zones 22 labeled, from the innermost zone to the outermost zone, as zones 22A to zone 22E. These zones 22 may also be referred to as the first to fifth zones 22 respectively. The outer or fifth zone 22E includes a freestanding portion 32 and an overlapping portion 34. The overlapping portion 34 extends through at least 50% of at least one other zone 22. For example, the overlapping portion 34 in FIG. 3 extends across the entire fourth zone 22D and partially into the third zone 22C, although it is also possible to have less overlap. Optionally, but not preferably, the freestanding portion 32 may be omitted. In a depth filter element 12 with more or less than 5 zones 22, the last zone is made as described for the fifth zone 22 above.

Preferably, though not shown in FIG. 3, a thin layer of bonding fibers, alternatively called shell or shell-forming fibers, is added over the outermost zone 22 as described in U.S. Pat. Nos. 6,938,781 and 6,986,427. The bonding fibers reduce the appearance of loose filament loops and provide a protective cage on the outer surface of the depth filter element 12. These bonding fibers may also shrink as they cool, which provides roughness to increase the effective surface area of the depth filter element 12.

While the Figures are directed to cylindrical filters, the same principles may be applied to a flat sheet or planar product. Such a flat product may be produced along a flat table with the filament sprayers oscillating across the width of the table or by cutting a depth filter element made on a large cylindrical mandrel along its length to obtain a sheet of material.

Figure 4:
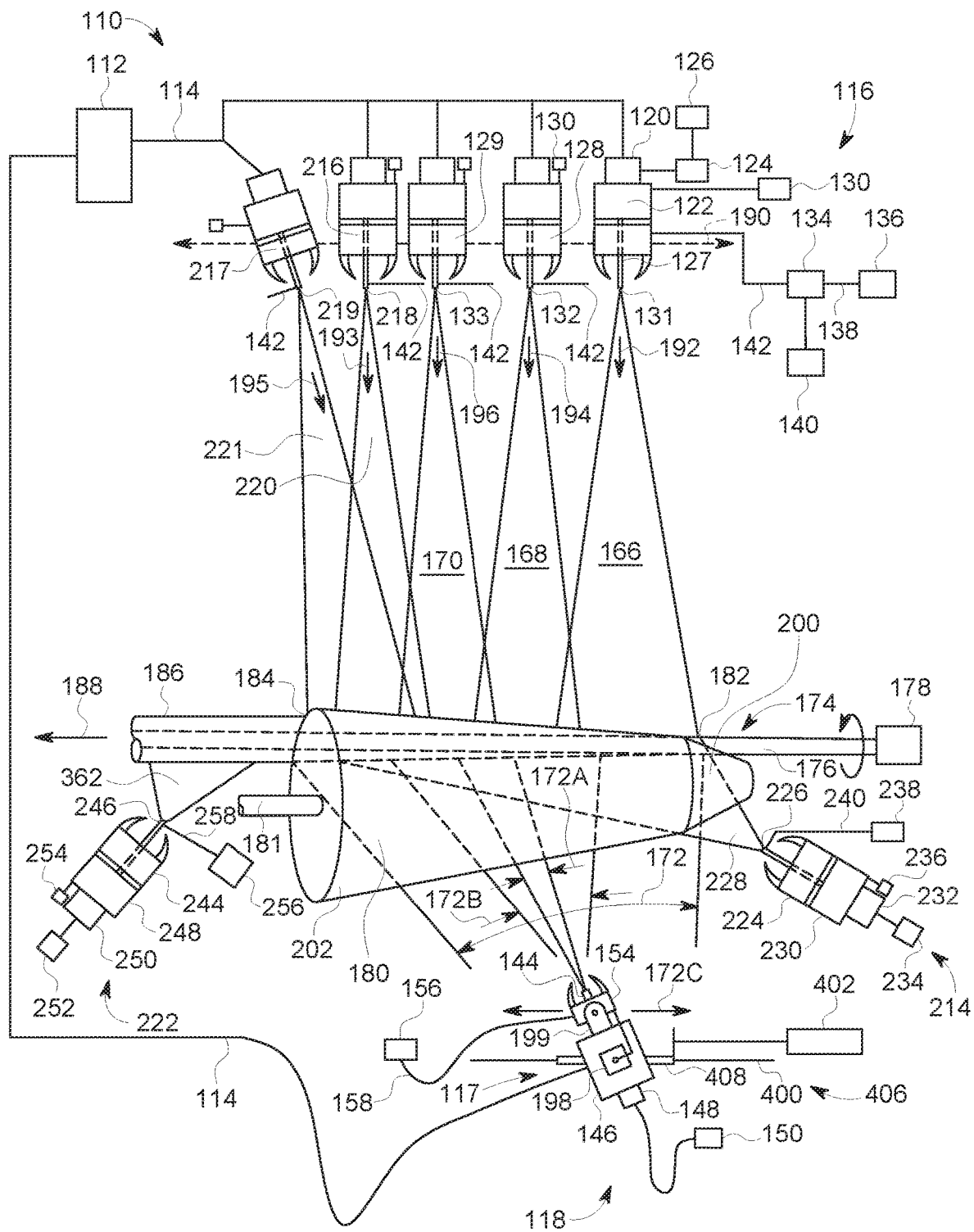
FIG. 4 is a schematic drawing of a machine for making the depth filter cartridge of FIG. 1.

FIG. 4 shows a system 110 for making a tubular depth filter media continuously to an indefinite length. The media can then be cut into a plurality of individual depth filter elements 12 of desired length. This system is similar to the system described in U.S. Pat. Nos. 6,938,781 and 6,986,427, for example FIG. 5 of U.S. Pat. No. 6,938,781, but with the addition of a filament delivery system to provide an optional fifth zone 22 and a laterally reciprocating nozzle assembly 117 to produce the Z-filament 30.

The system 110 includes motor driven screw type extruder 112, which is supplied with thermoplastic polymeric material from a source (not shown). Polypropylene is preferred but other materials such as polyesters, Nylon™, or polyurethanes may also be used for some or all of the filaments. Within extruder 112, the polymeric material is heated to a molten state, at which time it is metered and conveyed into heated delivery lines 114. The material is conveyed to two filament delivery systems 116 and 118. Alternatively, each of these filament delivery systems 116, 118 could have separate material conveying systems.

Filament delivery system 116 includes, for each of five nozzles 127, 128, 129, 216 and 217, a motor driven gear type positive displacement metering pump 120 which receives molten polymeric material from heated delivery line 114 and pumps it to heater block 122. The speed of motor 124 which drives metering pump 120, and thus the rate at which the material is metered through pump 120 is electronically controlled by an appropriate controller 126. Motor 124 and controller 126 are shown for only nozzle 127 to simplify the figure, but would typically also be provided one for each of nozzles 128, 129, 216 and 217.

Each heater block 122, which is independently heated via heating means (not shown), is provided with an internal passage that leads to one of nozzles 127, 128, 129, 216 and 217. The heating means, and thus the temperature of the polymeric material within heater block 122, is controlled by temperature control 130. Each nozzle 127, 128, 129, 216 and 217 includes an orifice, the size of which may be selected as desired to assist in achieving a desired filament size or diameter. The molten material fed to each nozzle 127, 128, 129, 216 and 217 exits the respective orifice in a stream. Preferably, the size of the orifices increases across the nozzles 127, 128, 129, 216 and 217 from the right to the left side of FIG. 4 such that nozzle 127 has the smallest orifice and nozzle 217 has the largest orifice.

Associated with each nozzle 127, 128, 129, 216 and 217 are attenuating mechanisms 131, 132, 133, 218 and 219, which comprise a plurality of gas or air jets. Gas flowing out of the attenuating mechanisms 131, 132, 133, 218 and 219 functions to attenuate the stream of molten material exiting from nozzles 127, 128, 129, 216 and 217 to form polymeric filaments in a manner known in the art. Attenuating mechanisms 131, 132, 133, 218 and 219 accordingly may be of any design known in the art including that described in U.S. Pat. No. 4,173,443 by Lin, the disclosure of which is incorporated herein by reference.

Attenuating mechanisms 131, 132, 133, 218 and 219 are associated with an optional gas heater 134 and gas supply source 136. Gas supply source 136 provides gas via conduit 138 and appropriate valves and regulators to heater 134. The temperature of heater 134 is elevated or lowered to the desired temperature via temperature control 140. The gas is then fed from heater 134 through conduit 142 to attenuating mechanism 131. Attenuating mechanisms 131, 132, 133, 218 and 219 may be provided with gas from a common supply source or alternatively separately controlled gas sources may be employed for each attenuating mechanism 131, 132, 133, 218 and 219. In the case of a common gas supply, flow control valves (not shown) are typically provided so that each attenuating mechanism 131, 132, 133, 218, 219 may receive air at a different rate.

Filament delivery system 118 is substantially similar to that of system 116 described above, except that filament delivery system 118 delivers a filament so as to actively intermingle with filaments produced by one or more of the nozzles used in system 116. Filament delivery system 118 has a nozzle assembly 117, which includes a polymer extrusion nozzle 144, a heater block 146, and an attenuator 154. Heater block 146 is connected to independently driven positive displacement metering pump 148 and motor 150. Heater block 146 is provided with temperature control 152. Pressurized gas is passed to attenuating mechanism 154 from gas supply source 156 via conduit 158. As with delivery system 116, the attenuator in system 118 can be associated with an optional gas heater, not shown. The provision of separate filament delivery systems 116 and 118 enables separate control and production of polymeric filaments produced by each part of system 116 and system 118.

The filament delivery system 118 is configured to provide compound motion of the nozzle assembly 117, which produces compound motion of the spray pattern of the filament produced by nozzle 144. In the example shown, attenuator 154 is mounted on a bracket 199 such that is can pivot relative to heater block 146. Attenuator 154 is connected to a sweep mechanism 198 configured to oscillate the attenuator 154. Nozzle assembly 117 is connected through heater block 146 to a laterally (side to side relative to mandrel 176) reciprocating mechanism 406. Other means of providing compound motion could also be used. For example, one alternative is to use a pivoting heater block 146 and a nozzle 144 and attenuator 154. However, it would be more difficult to rapidly pivot the heater block 146 than the attenuator 154 due to the greater mass of the heater block 146. In another alternative, the laterally reciprocating mechanism 406 could be replaced with a pivoting mechanism having a distant pivot point such that the nozzle assembly 117 moves back and forth through an arc rather than translates. In general, the motion of the nozzle assembly 117 does not need to be only lateral, but could also include one or more of movement up and down relative to mandrel 176, movement towards or away from mandrel 176, and rotation through an angle relative to mandrel 176, in addition to movement from side to side relative to the length of mandrel 176.

Delivery systems 116 and 118 produce streams of discrete, essentially continuous polymer filaments which are distributed in flared patterns 166, 168, 170, 220, 221, 172A and 228 directed from nozzles 127, 128, 129, 216, 217, 144, 224 and attenuating mechanisms 131, 132, 133, 218, 219, 154 and 226 respectively, toward filament collection device 174. There is preferably some overlap in adjacent filament patterns 166, 168, 170 and 220 so that the filaments of each pattern connect with the filaments of the respective adjacent patterns, resulting in an integrated tubular filament mass.

Further, filament pattern 221 overlaps with at least half of pattern 220, optionally at least 85% of pattern 220 or all of pattern 220, and possibly also part of pattern 170. Filament collection device 174 includes central, rotatable collection device 176, alternatively called a mandrel, which extends from drive motor 178. Press roller 180, which rotates about axle shaft 181, is disposed adjacent to mandrel 176 and spaced therefrom. The completed filter element 12 is removed from the open end of collection device 176, which is not visible but would be at the left side of the collection device 176 shown in FIG. 4.

During operation, the essentially continuous polymer filaments of streams 166, 168, 170, 220 and 221 are directed in a flared pattern toward rotating mandrel 176 and collected thereon. While mandrel 176 is shown, it is contemplated that other collection devices may also be used, such as large diameter drums. Simultaneously, an essentially continuous filament or fiber stream is directed according to compound filament pattern 172, which spans generally between a far edge 182 of stream 166 and a far edge 184 of stream 221 and traverses the layers of filaments laid down by streams 166, 168, 170, 220 and 221. Rotating press roller 180 engages the filaments that have accumulated on rotating mandrel 176. As sufficient filaments are built up on mandrel 176, press roller 180 forces non-woven filament mass or fiber structure 186 off the axial (open) end of mandrel 176 in the direction of arrow 188 to produce a continuous filament mass 186 of indefinite length. Filament mass 186 is cut in segments to produce elements 12. Filament mass 186 has a radial dimension, a longitudinal dimension, and a circumferential dimension. The entire filament collection device 174 may be similar to that described in U.S. Pat. No. 4,240,864 by Lin, the disclosure of which is incorporated herein by reference.

Nozzles 127, 128, 129, 216 and 217 are longitudinally aligned along common axis 190, which is preferably about 0-15 degrees offset from parallel to mandrel 176. Each nozzle 127, 128, 129, 216 and 217 includes an orifice that defines an axis 192, 194, 196, 193 and 195 respectively. Axes 192, 194, 196 and 193 are preferably perpendicular to axis 190 and about 0-15 degrees offset from perpendicular to mandrel 176. Axes 192, 194, 196, 193 and 195 generally correspond to the flow axis of molten polymer exiting the respective nozzle orifice. This orientation results in flared filament patterns 166, 168, 170, 220 and 221 being directed toward mandrel 176. Filament pattern 221 is preferably angled inwards, towards filament pattern 170, to assist in providing an overlap of filament pattern 221 with filament pattern 220 and optionally filament pattern 170. Filament pattern 221 is preferably angled by angling nozzle 217 inwards. Optionally, attenuator 219 can also be angled inwards.

As a non-limiting example, polymer filaments of filament patterns 166, 168, 170, 220 and 221 may be produced by extruding polypropylene heated to a temperature of between about 280 degrees C. and about 400 degrees C. at a rate of about 5 to 20 pounds per hour per nozzle while passing an ambient gas at a temperature of about 25 degrees C. at a rate of about 10 to 20 standard cubic feet per minute over the molten polymer stream exiting the nozzle orifice. The mandrel 176 may rotate at between 200 and 600 rpm.

Compound filament pattern 172 comprises attenuated pattern 172A, high frequency pattern 172B and low frequency pattern 172C. Attenuated pattern 172A is generally conical pattern generated by the somewhat random movement of the filament as it is blown by air jets from the attenuator 154. High frequency pattern 172B is created by pivoting attenuated pattern 172A so that is sweeps across a distance of about 50% to 85% of the distance between the primary pattern edges 182 and 184 at the mandrel 176. The entire high frequency pattern 172B moves from side to side according to low frequency pattern 172C to create the entire compound filament pattern 172, which generally covers the entire distance between edges 182 and 184 at the mandrel 176. Compound filament pattern 172 originates from a nozzle assembly 117 located in a position above or below press roll 180 so that compound filament pattern 172 travels from nozzle 144 to mandrel 176 and lands on the forming filament mass 186 without spraying directly onto press roller 180.

Servo driven sweep mechanism 198 causes attenuating mechanism 154 to sweep back and forth through an angle so that the attenuated pattern 172A traverses back and forth along a longitudinal dimension of filament mass 186 according to high frequency pattern 172B. As pattern 172A traverses two or more of fiber patterns 166, 168, 170, 220 and 221 with each sweep, and continues sweeping while reciprocating laterally, it deposits an essentially continuous polymer filament across the overall laydown pattern, which extends between the primary pattern edges 182 and 184.

In a preferred embodiment, sweep mechanism 198 comprises a servo drive motor with a cam and follower mechanism. Other suitable devices, such as AC/DC driven mechanical cranks and push rod mechanisms, for example, are also acceptable. In a preferred embodiment, sweep mechanism 198 runs at about 800 to 1200 oscillations per minute while the mandrel 176 rotates at 200 to 600, preferably 240 to 400, revolutions per minute (RPM).

Sweep mechanism 198 is mounted on heater block 146, which also functions as a base for the nozzle 144 and attenuator 154. Heater block 146 is attached to carriage 408 which is mounted to, and slides on, track 400. Track 400 is preferably generally parallel to mandrel 176. Pneumatic cylinder 402 translates heater block 146 back and forth along track 400, for example at about 1 to 20 oscillations per minute. Optionally, heater block 146 may be angled to point nozzle 144 towards pattern edge 184 by up to 45 degrees. Optionally, pneumatic cylinder 402 may be operated such that the nozzle 144 dwells at its left most position, for example for 1-3 seconds, before moving back to the right. Dwell at the right most position, if any, is preferably less than 0.5 seconds. When moving between its end points, the nozzle assembly 117 has a generally constant velocity. Optionally the nozzle assembly 117 may be reciprocated by a servo or other mechanism, and it may have non-linear motion. In another options, the nozzle assembly may swing through an arc rather than moving laterally.

Preferably, the fiber of compound filament pattern 172 is still relatively liquid when it contacts the fibers of filament patterns 166, 168, 170, 220 and 221. Because a skin or shell has not completely formed on the fiber of compound filament pattern 172, it instantaneously adheres to the fibers of filament patterns 166, 168, 170, 220 and 221 upon contact. However, some attenuation or cooling of the fiber of compound filament pattern 172 is required to avoid melting of the fibers of filament patterns 166, 168, 170, 220 and 221.

As a non-limiting example, polymer filaments of compound filament pattern 172 are produced in the depth filter of the instant invention by passing polypropylene heated to a temperature of between about 280 degrees C. and about 400 degrees C. through a nozzle having an orifice size of about 0.016 inch at a rate of about 8 pounds per hour and passing at an ambient gas at a temperature of about 25 degrees C. at a rate of about 7 standard cubic feet per minute over the molten polymer stream exiting the nozzle orifice. Other suitable parameter combinations may also be used.

An accumulated mass of filaments 186 is produced on mandrel 176. In one embodiment, press roller 180 is oriented at an angle relative to mandrel 176 with nip 200 in contact with mandrel 176. As a non-limiting example, outer surface 202 of press roller 180 is angularly displaced by about 1 to 10 degrees relative to mandrel 176. In one embodiment, nip 200 contacts mandrel 176 close to edge 182 of filament pattern 166. Because of the angular placement of press roller 180, compression of filaments in collective filament mass 186 varies along the length of press roller 180. This results in a filament mass having a varying density gradient in the radial dimension, with the filament density of filament pattern 166 being generally greater than that of the filament masses comprised of outer filament patterns.

Fibers from filament patterns 166, 168, 170, 220 and 221 form a generally two-dimensional mat or layer of material that is continuously formed on mandrel 176 to build up filament mass 186 composed of many layers of fibers. These fibers can be described as being laid down in an X-Y plane, or in the longitudinal and circumferential (or latitudinal) dimensions. As the fibers are built up, layer upon layer, they produce a radial or depth dimension. Compound filament pattern 172, combined with the rotation of mandrel 176, causes the fibers coming from nozzle 144 to integrate into mass 186 as a "z" direction fiber, extending radially through the zones produced by filament patterns 166, 168, 170, 220 and 221. Filament patterns 166, 168, 170, 220 and 221 produce the zones 22 shown in FIG. 3. Z-filament 30 of FIG. 3 is produced by compound filament pattern 172. Z-filament 30 is preferably placed in a continuous manner from the inside to the outside and back to the inside of 2 or more of the zones 22 during approximately 120 degrees or less of rotation of the depth filter element 12 and over all of the zones 22 during approximately 10 or more rotations (3600 degrees or more of rotation) of the depth filter element 12.

System 110 preferably further includes filament delivery system 214 which is substantially similar to that of system 116 described above, except that filament delivery system 214 preferably includes a means of delivering the filaments in such a manner that they intermingle with filaments produced by one or more of the nozzles used in system 116. Filament delivery system 214 may include one or more polymer extrusion nozzles. One embodiment uses one nozzle 224 with attenuator 226, positioned at an acute angle relative to mandrel 176 to deliver a filament pattern or stream 228 which contacts filament mass 186 in a pattern which intermingles with at least some of filament patterns 166, 168, 170, 220 and 221 and filament pattern 172.

Specifically, system 214 includes heater block 230, independently driven positive displacement metering pump 232 and motor 234. Heater block 230 is provided with nozzle 224 and temperature control 236. System 214 is also provided with attenuating mechanism 226 associated with nozzle 224. Pressurized gas is passed to attenuating mechanism 226 from gas supply source 238 via conduit 240. As with delivery system 116, attenuators 226 can be associated with an optional gas heater, not shown. The provision of separate filament delivery systems 118 and 214 enables separate control and production of polymeric filaments produced by each system 118 and 214, although each of the filament delivery systems 118 and 214 produces filaments which traverse filament mass 186 in a radial, or z, dimension. In one embodiment, the source of material for filament delivery system 214 is extruder 112 via delivery line 114; in another embodiment, the material source for system 214 is separate to provide alternate materials to those used in filament delivery systems 116, 118 and 214.

Delivery system 214 produces a stream of a discrete, essentially continuous polymer filament that is distributed in flared pattern 228 and directed from nozzle 224 and attenuating mechanism 226 toward filament collection device 174. During operation, the filament pattern 228 is directed in a flared pattern toward rotating mandrel 176. In one embodiment, filament pattern 228 spans the distance between a far edge 182 of stream 166 and a far edge 184 of stream 221. In an alternative embodiment, filament pattern 228 does not span the distance between far edges 182 and 184, but does cover a significant portion of the forming layers of filament mass 186, e.g., the distance covered by filament pattern 228 is greater than the distance covered by each primary filament stream 166, 168, 170, 220 and 221 individually. Preferably the distance covered by filament pattern 228 is greater than the distance covered by two or more adjacent primary filament streams 166, 168, 170, 220 and 221. In one embodiment, nozzle 224 is placed at an acute angle of about 10 degrees to about 20 degrees relative to mandrel 176. Static filament 28 in FIG. 3 corresponds with the filament of spray pattern 228.

Shell-forming filament delivery system 222 is substantially similar to system 116 described above, except that shell-forming filament delivery system 222 is preferably configured and positioned to produce a relatively smooth outer shell zone on the exterior cylindrical surface of filament mass 186. Shell-forming filament delivery system 222 preferably uses a different location, polymer throughput rate, and air attenuation setting relative to filament delivery system 116. Compared to system 116, nozzle 244 is preferably placed closer to mandrel 176 and uses a lower polymer throughput rate; additionally, attenuating mechanism 246 uses less air attenuation. Similar to system 116, shell-forming filament delivery system 222 includes heater block 248, metering pump 250, motor 252, temperature control 254, gas supply source 256, and conduit 258. As a non-limiting example, polymer filaments of filament pattern 262 is produced by extruding polypropylene heated to a temperature of between about 240 degrees C. and about 325 degrees C. through nozzle 244 having an orifice size of about 0.016 inch at a rate of about 1 pound per hour and passing an ambient gas at a temperature of about 25 degrees C. at a rate of about 1.5 standard cubic feet per minute over the molten polymer stream exiting the nozzle orifice.

Nozzle 244 is preferably placed so that the filament produced thereby is deposited on the outer zone 22e formed by filament pattern 221. This configuration produces a very shallow zone or shell with significant fiber-to-fiber bonding, including some bonding between the fibers of the shell and the fibers of outer zone 22e. The fiber-to-fiber bonding of the shell essentially eliminates the presence of loose fibers on the surface of the finished depth filter element 12 and significantly increases the surface area of the resulting depth filter element 12.

A sample element was made with a Z-filament nozzle assembly having compound motion. The element had a 3 inch (76 mm) inside diameter and 6.5 inch (165 mm) outer diameter. The element had 5 concentric zones produced by 5 fixed nozzles that collectively produced a 22 inch (560 mm) wide spray pattern. The Z-filament nozzle had an attenuator that produced a spray pattern about 10-15 degrees wide. The Z-filament attenuator oscillated at a rate of 1200 cycles per minute. The mandrel rotated at 400 revolutions per minute. The oscillations of the Z-filament attenuator produced a spray pattern that is about 16 inches (410 mm) wide at the mandrel. The Z-filament nozzle is mounted to a heater block that is angled towards the free end of the mandrel (to the left in FIG. 4) but displaced away from the free end of the mandrel such that the nozzle is still aimed at about the center of the fixed nozzle spray pattern. The nozzle assembly reciprocates through a distance of about 6 inches (150 mm) at a rate of about 5.5 to 6 cycles per minute. The nozzle assembly dwells for about 1 to 2 seconds at the side of its travel closest to the free end of the mandrel.

Alternative elements of the same inside and outside diameter and total filament mass were made a) by oscillating the Z-filament attenuator but without reciprocating the Z-filament nozzle assembly, which was fixed at about the middle of its range of motion and b) by reciprocating the Z-filament nozzle assembly but not oscillating the Z-filament attenuator nozzle.

The sample element, with compound nozzle assembly motion, and the alternative elements were tested under essentially identical conditions. There were no visual signs of crushing or other deformation of the element, and no signs of crushing demonstrated by changes in filtrate turbidity, throughout the lifetime of the sample element. However, both of the alternative elements had visual signs of crushing and increased filtrate turbidity towards the ends of their lifetimes. The first alternative element, with attenuator oscillation only, had a lifetime only 40% as long as the sample element, and only 52% of the dirt holding capacity of the sample element. The second alternative element, with nozzle assembly translation only, had a lifetime 55% as long as the sample element, and 75% of the dirt holding capacity of the sample element.

In another example two smaller sample elements were made with a Z-filament nozzle assembly having compound motion. These elements had a 1 inch (25 mm) inside diameter and 2.5 inch (64 mm) outer diameter. The elements had 4 concentric zones produced by 4 fixed nozzles. The Z-filament nozzle oscillated and reciprocated generally as described above. In one sample a wide angle of oscillation was used and in the other sample a narrow angle of oscillation was used. An alternative element of the same inside and outside diameter and total filament mass was made by oscillating the Z-filament attenuator but without reciprocating the Z-filament nozzle assembly. The sample elements made with compound nozzle assembly motion and the alternative elements were tested under essentially identical conditions. The alternative element has a lifetime of 61 minutes. The sample element with narrow angle of oscillation hade a lifetime of 68 minutes. The sample element with wide angle of oscillation hade a lifetime of 82 minutes.

U.S. Pat. Nos. 6,358,417; 6,916,395; 6,938,781; and, 6,986,427 are incorporated herein by reference. International Publication Number WO 2012034028 is incorporated herein by reference. International Application Number PCT/CA2014064125 is incorporated herein by reference.

One or more embodiments of the invention have been described in this detailed description with reference to the drawings to help disclose the invention and enable the invention to be practiced. However, the invention is defined by the claims and it is not intended to limit the claims to these specific examples or embodiments. The claims may include alternatives, modifications and equivalents.

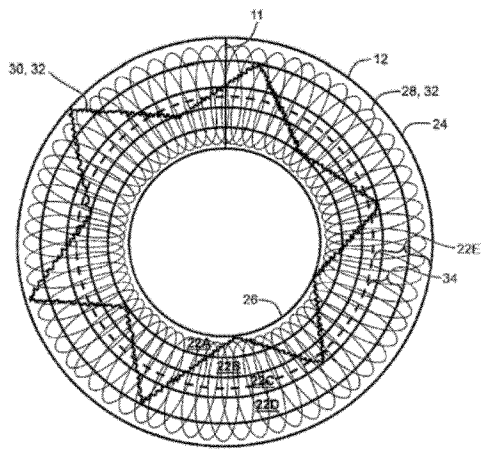

We claim:

1. A depth filter element comprising,
   an outside surface and an inside surface,
   one or more first filaments deposited in layers, the one or more first filaments forming a helicoid, and a traversing filament, wherein, the traversing filament is deposited on the one or more first filaments between the layers in a pattern that traverses back and forth across a helix on the helicoid, wherein the helix has an oscillating diameter and wherein more of the mass of the traversing filament is deposited towards the outside surface of the element.

2. The element of claim 1 wherein the traversing filament follows an oscillating path wherein the traversing filament traverses through part of the depth of the element in a single oscillation but traverses through more of the depth of the element over multiple oscillations.

3. The element of claim 1 wherein, in a part of the helix, the diameter of the helix oscillates at a constant rate.

4. The element of claim 1 wherein, in part of the helix, the diameter of the helix is constant.

5. The element of claim 1 wherein the one or more first filaments form a set of concentric zones.

6. The element of claim 5 wherein a first filament of an outer zone overlaps, intersects or intermingles with a first filament of another zone through at least 50% of the other zone.

7. The element of claim 5 having four or more concentric zones or five or more concentric zones.

8. The element of claim 1 having an outside diameter of 2.0 inches or more.

* * * * *

UNITED STATES PATENT AND TRADEMARK OFFICE
CERTIFICATE OF CORRECTION

PATENT NO. : 11,266,936 B2
APPLICATION NO. : 15/549446
DATED : March 8, 2022
INVENTOR(S) : Travis Gerald Stifter and Thomas Martin Aune It is certified that error appears in the above-identified patent and that said Letters Patent is hereby corrected as shown below:

On the Title Page

Under ABSTRACT "8 Claims, 4 Drawing Sheets" should read: -- 9 Claims, 4 Drawing Sheets -- as shown on the attached page.

In the Claims

Column 15, Line 28 please add:
9. The element of claim 1 having an outside diameter of 4.5 inches or more.

Signed and Sealed this
Twenty-eighth Day of June, 2022

Katherine Kelly Vidal
*Director of the United States Patent and Trademark Office*

(12) United States Patent
Stifter et al.

(10) Patent No.: US 11,266,936 B2
(45) Date of Patent: Mar. 8, 2022

(54) MELT-BLOWN DEPTH FILTER ELEMENT, METHOD AND MACHINE OF MAKING IT

(71) Applicant: GENERAL ELECTRIC COMPANY, Schenectady, NY (US)

(72) Inventors: Travis Gerald Stifter, Minnetonka, MN (US); Thomas Martin Aune, Minnetonka, MN (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 488 days.

(21) Appl. No.: 15/549,446

(22) PCT Filed: Apr. 1, 2016

(86) PCT No.: PCT/US2016/025758
§ 371 (c)(1),
(2) Date: Aug. 8, 2017

(87) PCT Pub. No.: WO2016/175982
PCT Pub. Date: Nov. 3, 2016

(65) Prior Publication Data
US 2018/0028954 A1 Feb. 1, 2018

Related U.S. Application Data

(60) Provisional application No. 62/153,641, filed on Apr. 28, 2015.

(51) Int. Cl.
*B01D 39/00* (2006.01)
*B01D 39/16* (2006.01)
*B01D 24/00* (2006.01)

(52) U.S. Cl.
CPC ....... *B01D 39/163* (2013.01); *B01D 39/1623* (2013.01); *B01D 2239/065* (2013.01); *B01D 2239/0622* (2013.01); *B01D 2239/10* (2013.01)

(58) Field of Classification Search
CPC .. B01D 24/001; B01D 24/004; B01D 24/008; B01D 24/007; B01D 27/00;
(Continued)

(56) References Cited

U.S. PATENT DOCUMENTS 3,073,735 A  1/1963 Till et al.
3,251,475 A  5/1966 Till et al.
(Continued)

FOREIGN PATENT DOCUMENTS

CA  2142857 A1  3/1994
CA  2810064 A1  3/2012
(Continued)

OTHER PUBLICATIONS

Canadian Patent Application No. 2370787, Office Action dated Apr. 6, 2009.
(Continued)

*Primary Examiner* — Allison G Fitzsimmons

(57) ABSTRACT

A tubular depth filter element has one or more concentric zones. Each zone includes layers of a melt blown filament. An additional filament oscillates through the depth of the element, traversing through part of the depth of the filament with each oscillation but traversing through substantially all of the depth of the element over multiple oscillations. The traversing filament is preferably biased towards the outside of the element. The depth filter element may be made by spraying filaments onto a rotating mandrel. The filaments of the concentric zones are sprayed from fixed nozzles spaced apart along the length of the mandrel. The traversing filament is sprayed from a nozzle assembly that moves laterally or has compound motion relative to the mandrel. For example, the nozzle assembly may oscillate relative to the mandrel while an air attenuator of the nozzle assembly oscillates relative to the remainder of the nozzle assembly.

9 Claims, 4 Drawing Sheets